United States Patent
Sugihara et al.

(10) Patent No.: US 9,234,097 B2
(45) Date of Patent: Jan. 12, 2016

(54) AQUEOUS DISPERSION OF POLYAMIDE RUBBER ELASTIC BODY AND METHOD OF PRODUCING THE SAME

(71) Applicant: Sumitomo Seika Chemicals Co., Ltd., Hyogo (JP)

(72) Inventors: Norihiro Sugihara, Himeji (JP); Jun Sakata, Himeji (JP); Hirofumi Fujita, Himeji (JP)

(73) Assignee: SUMITOMO SEIKA CHEMICALS CO., LTD., Kako-Gun, Hyogo (JP)

(*) Notice: Subject to any disclaimer, the term of this patent is extended or adjusted under 35 U.S.C. 154(b) by 0 days.

(21) Appl. No.: 13/759,777

(22) Filed: Feb. 5, 2013

(65) Prior Publication Data

US 2013/0150508 A1 Jun. 13, 2013

Related U.S. Application Data

(62) Division of application No. 12/377,836, filed as application No. PCT/JP2007/064053 on Jul. 10, 2007, now abandoned.

(30) Foreign Application Priority Data

Aug. 18, 2006 (JP) .................. 2006-222926

(51) Int. Cl.
| | |
|---|---|
| *C08L 77/12* | (2006.01) |
| *C08G 69/40* | (2006.01) |
| *C08J 3/05* | (2006.01) |
| *C08L 77/06* | (2006.01) |

(52) U.S. Cl.
CPC ................. *C08L 77/12* (2013.01); *C08G 69/40* (2013.01); *C08J 3/05* (2013.01); *C08L 77/06* (2013.01); *C08J 2377/12* (2013.01)

(58) Field of Classification Search
CPC ......... C08L 77/12; C08L 77/06; C08G 69/40; C08J 3/05
USPC .......................................................... 524/156
See application file for complete search history.

(56) References Cited

U.S. PATENT DOCUMENTS

| | | | | |
|---|---|---|---|---|
| 4,376,856 | A | * 3/1983 | Tanaka et al. | 528/292 |
| 5,948,880 | A | * 9/1999 | Fischer et al. | 528/339.3 |
| 2003/0017223 | A1 | * 1/2003 | Tasaka et al. | 425/88 |

FOREIGN PATENT DOCUMENTS

| | | | | |
|---|---|---|---|---|
| EP | 1783156 A1 | | 5/2007 | |
| FR | 2793801 | * | 11/2000 | ........... C09D 133/08 |
| JP | 64-62330 | * | 3/1989 | ................. C08J 3/06 |

OTHER PUBLICATIONS

The Office Action, dated Sep. 29, 2014, issued in the corresponding European Patent Application No. 07768430.6.

* cited by examiner

*Primary Examiner* — John Uselding
(74) *Attorney, Agent, or Firm* — Birch, Stewart, Kolasch & Birch, LLP

(57) ABSTRACT

An aqueous dispersion of polyamide rubber elastic body, which contains an aqueous medium and a polyamide rubber elastic body emulsified and dispersed in the aqueous medium in the presence of a surfactant. The surfactant is used in an amount of 1 to 20 parts by weight based on 100 parts by weight of the polyamide rubber elastic body, and is for example at least one member selected from the group consisting of a polyoxyalkylene alkyl ether sulfate, a dialkyl sulfosuccinate, a fatty acid salt and an ethylene oxide/propylene oxide copolymer. This aqueous dispersion can produce a molded article having the characteristics of the polyamide rubber elastic body, particularly a molded article which hardly suffers from bleeding of the surfactant and is excellent in transparency.

5 Claims, No Drawings

US 9,234,097 B2

AQUEOUS DISPERSION OF POLYAMIDE RUBBER ELASTIC BODY AND METHOD OF PRODUCING THE SAME

This application is a divisional of co-pending application Ser. No. 12/377,836, filed on Feb. 17, 2009, which claims priority to PCT International Application No. PCT/JP2007/064053 filed under 35 U.S.C. §371 on Jul. 10, 2007 which claims priority to Japanese Application No. JP2006-22926 filed on Aug. 18, 2006, the entire contents of each of which are hereby incorporated by reference.

TECHNICAL FIELD

The present invention relates to an aqueous dispersion of rubber elastic body and a method of producing the same and in particular to an aqueous dispersion of polyamide rubber elastic body and a method of producing the same.

BACKGROUND ART

A polymeric rubber elastic body essentially has either a soft polymer structure or a structure consisting of a rigid polymer system combined with a soft polymer system, and is used in a wide variety of industrial fields because it has rubber elasticity at ordinary temperatures and it can be mechanically molded due to its plasticization at high temperatures similar to thermoplastics. Typical polymeric rubber elastic bodies include those based on styrene, olefin, polyester, polyurethane, polyvinyl chloride, and polyamide. These polymeric rubber elastic bodies are usually provided as molded articles produced by mechanical operation such as extrusion molding, and when used in coating agents for various materials, adhesives, binders, modifiers such as emulsions, or binders for fibers, the polymeric rubber elastic bodies are used desirably in the form of aqueous dispersions.

Aqueous dispersions of polymeric rubber elastic bodies have been extensively examined, among which an aqueous dispersion of a styrene rubber elastic body has been provided as a practical product. The aqueous dispersion of a styrene rubber elastic body is produced usually by mixing an organic phase containing a styrene rubber elastic body dissolved in an organic solvent, with an aqueous phase containing an emulsifier (surfactant) dissolved in an aqueous medium, and emulsifying the mixture with a homomixer or the like, followed by removing the organic solvent (see, for example, JP 51-23532 A and JP 2003-253134 A).

However, molded articles obtained from the aqueous dispersion of a styrene rubber elastic body are generally inferior in abrasion resistance, flex resistance, oil resistance, and weather resistance. A polyamide rubber elastic body, on the other hand, can produce molded articles not only excellent in these properties but also excellent in transparency, flexibility, impact strength, tensile strength, chemical resistance, and heat resistance, and further has an advantage that its molded articles can be made thin-walled because it has higher stress upon deformation than other polymeric rubber elastic bodies of the same rigidity, and is thus useful for example as a material for producing packaging films, automobile parts, sporting goods, and medical devices. Accordingly, an aqueous dispersion of polyamide rubber elastic body has been desired to be realized as there has been no example of practical application thereof.

An object of the present invention is to realize an aqueous dispersion of polyamide rubber elastic body capable of producing a molded article having the characteristics of the polyamide rubber elastic body, particularly a molded article which hardly suffers from bleeding of a surfactant and is excellent in transparency.

DISCLOSURE OF THE INVENTION

An aqueous dispersion of polyamide rubber elastic body according to the present invention contains an aqueous medium and a polyamide rubber elastic body emulsified and dispersed in the aqueous medium in the presence of a surfactant. In the aqueous dispersion, the surfactant is used in an amount of 1 to 20 parts by weight based on 100 parts by weight of the polyamide rubber elastic body.

The polyamide rubber elastic body used in this aqueous dispersion is, for example, one of copolymers among a polyether block amide copolymer and a polyether ester block amide copolymer. The surfactant used in this aqueous dispersion is, for example, at least one member selected from the group consisting of a polyoxyalkylene alkyl ether sulfate, a dialkyl sulfosuccinate, a fatty acid salt and an ethylene oxide/propylene oxide copolymer. This aqueous dispersion may further contain a polymeric dispersion stabilizer. The average particle diameter of particles of the polyamide rubber elastic body emulsified and dispersed in this aqueous dispersion is usually 0.1 to 5 μm.

As the amount of the surfactant in the aqueous dispersion of polyamide rubber elastic body is controlled relative to the polyamide rubber elastic body, the aqueous dispersion can produce a molded article having the characteristics of the polyamide rubber elastic body, particularly a molded article which hardly suffers from bleeding of the surfactant and is excellent in transparency.

The molded article of the polyamide rubber elastic body according to the present invention is obtained from the aqueous dispersion of polyamide rubber elastic body according to the present invention.

The method of producing an aqueous dispersion of polyamide rubber elastic body according to the present invention includes the steps of mixing an organic phase containing a polyamide rubber elastic body dissolved in an organic solvent, with an aqueous phase containing a surfactant dissolved in an aqueous medium, to preparing an emulsion, and distilling the organic solvent off from the emulsion. In this method, the surfactant is used in an amount of 1 to 20 parts by weight based on 100 parts by weight of the polyamide rubber elastic body.

The organic solvent used herein is usually a mixture of an aromatic hydrocarbon solvent or an alicyclic hydrocarbon solvent and an alcohol solvent. The aqueous phase used in this production method contains, for example, a polymeric dispersion stabilizer.

The method of producing an aqueous dispersion of polyamide rubber elastic body according to another embodiment of the present invention includes the steps of preparing a mixture containing a polyamide rubber elastic body, a surfactant and an aqueous medium, and emulsifying the mixture at a temperature not lower than the softening temperature of the polyamide rubber elastic body. In this method, the surfactant is used in an amount of 1 to 20 parts by weight based on 100 parts by weight of the polyamide rubber elastic body.

Other objects and results of the present invention are referred to in the following detailed description.

BEST MODE FOR CARRYING OUT THE INVENTION

An aqueous dispersion of polyamide rubber elastic body according to the present invention contains an aqueous medium and a polyamide rubber elastic body emulsified and dispersed in the aqueous medium in the presence of a surfactant.

The aqueous medium used in the present invention is essentially water. This water may be various kinds of water such as tap water, industrial water, ion exchanged water, deionized water and pure water, among which pure water is preferable. This water may be appropriately compounded as necessary with a pH adjuster, a defoaming agent, a viscosity modifier, an antifungal agent and an antioxidant as long as the object of the present invention is not hindered.

The polyamide rubber elastic body used in the present invention, though not particularly limited, has for example a structure wherein a rigid polymer system having a crystalline polyamide block with a high melting point is combined with a soft polymer system having a noncrystalline polyether block with a low glass transition temperature. Constituent components of the polyamide block possessed by the rigid polymer system include, for example, lactam compounds such as caprolactam, capryllactam, enantholactam and laurolactam, aminocarboxylic acid compounds such as ω-aminocaproic acid, ω-aminoenanthic acid, ω-aminocaprylic acid, ω-aminoperconic acid, ω-aminocapric acid and 11-aminoundecanoic acid, or salts between a diamine compound such as ethylene diamine, triethylene diamine, tetraethylene diamine or hexamethylene diamine and a dicarboxylic acid compound such as oxalic acid, succinic acid, glutaric acid, adipic acid, pimelic acid, sebacic acid, terephthalic acid or isophthalic acid. Two or more of these constituent parts may be used. Constituent components of the polyether block possessed by the soft polymer system include, for example, glycol compounds such as polyethylene oxide glycol, polypropylene oxide glycol, polytetramethylene oxide glycol and polyhexamethylene oxide glycol, and diamine compounds such as polyether diamine. Two or more of these constituent parts may be used.

Specific examples of the polyamide rubber elastic body as described above include several types of elastic bodies different in the molecular structure of a binding portion, that is, the binding form between the polyamide block and the polyether block, for example, a polyether block amide copolymer having a binding form "(polyamide block)-CO—NH-(polyether block)" and a polyether ester block amide copolymer having a binding form "(polyamide block)-CO—O-(polyether block)".

The polyamide rubber elastic body used may be a commercial one or a suitably produced one. The method of producing the polyamide rubber elastic body includes, for example, a method wherein at least one compound selected from a lactam compound, an aminocarboxylic acid compound and a diamine compound is reacted with a dicarboxylic acid to prepare a polyamide block, both the terminals of which are substantially carboxyl groups, followed by adding to this polyamide block a glycol compound such as polyethylene oxide glycol or a diamine compound such as polyether diamine and then heating the mixture.

Examples of the surfactant used in the present invention include, but are not limited to, an anionic surfactant and a nonionic surfactant.

Examples of the anionic surfactant include a polyoxyalkylene alkyl ether sulfate, a polyoxyalkylene alkyl phenyl ether sulfate, an alkylbenzene sulfonate, an alkyl naphthalene sulfonate, an alkyl diphenyl sulfonate, an α-olefin sulfonate, an alkyl sulfate, a naphthalene sulfonate-formalin condensate, a dialkyl sulfosuccinate, a polyoxyethylene alkyl ether acetate, a rosin acid salt and a fatty acid salt. Among them, a polyoxyalkylene alkyl ether sulfate, a dialkyl sulfosuccinate and a fatty acid salt are preferable from the viewpoint of excellent emulsion dispersibility and stability and of easy availability at low cost.

The polyoxyalkylene alkyl ether sulfate is a compound represented by the following general formula (1):

$$R^1(AO)_nSO_3X \qquad (1)$$

wherein X represents a sodium atom, a potassium atom, an amino group or an ammonium group, $R^1$ represents an alkyl or alkenyl group having 5 to 24 carbon atoms, n is an integer of 2 to 50 indicative of the number of moles of AO added per molecule, and $(AO)_n$ is an atomic group represented by the following formula (1-a):

$$(C_2H_4O)_h(C_3H_6O)_k \qquad (1\text{-}a)$$

wherein h and k each represent an integer of 0 to 50, and the sun of h and k is n defined above. When both of h and k are not 0, the order of the ethylene oxide unit $((C_2H_4O))$ and the propylene oxide unit $((C_3H_6O))$ in the sequence is not limited, and therefore $(AO)_n$ can include the units in the form of block or random.

Specific examples of the polyoxyalkylene alkyl ether sulfate include polyoxyalkylene lauryl ether sulfates and polyoxyalkylene oleyl ether sulfates. More specifically, the polyoxyalkylene lauryl ether sulfates can be exemplified by sodium polyoxyalkylene lauryl ether sulfates such as sodium polyoxyethylene lauryl ether sulfate and sodium polyoxypropylene lauryl ether sulfate and ammonium polyoxyalkylene lauryl ether sulfates such as ammonium polyoxyethylene lauryl ether sulfate. The polyoxyalkylene oleyl ether sulfates include sodium polyoxyalkylene oleyl ether sulfates such as sodium polyoxyethylene oleyl ether sulfate and sodium polyoxypropylene oleyl ether sulfate and ammonium polyoxyalkylene oleyl ether sulfates such as ammonium polyoxyethylene oleyl ether sulfate. Among them, polyoxyalkylene lauryl ether sulfates, particularly sodium polyoxyalkylene lauryl ether sulfates are preferable, and sodium polyoxyethylene lauryl ether sulfate is particularly preferable.

The dialkyl sulfosuccinate is a compound represented by the following general formula (2):

$$YO_3SCH(CH_2COOR^2)COOR^3 \qquad (2)$$

wherein Y represents a sodium atom, a potassium atom, an amino group or an ammonium group, $R^2$ and $R^3$ each represent an alkyl or phenyl group having 5 to 12 carbon atoms and may be the same or different.

Specific examples of the dialkyl sulfosuccinate include dioctyl sulfosuccinate, diethylhexyl sulfosuccinate, dialkylphenyl sulfosuccinate and didodecyl sulfosuccinate. Among them, dioctyl sulfosuccinate is particularly preferable.

The fatty acid salt is a compound represented by the following general formula (3):

$$R^4COOM \qquad (3)$$

wherein $R^4$ represents an alkyl or alkenyl group having 5 to 24 carbon atoms, and M represents a sodium atom, a potassium atom, an amino group or an ammonium group.

Specific examples of the fatty acid salt include oleates, stearates, laurates, myristates and palmitates. Among them, oleates are preferable.

Examples of the nonionic surfactant include polyethylene glycol, an ethylene oxide/propylene oxide copolymer, a polyoxyethylene alkyl ether, a polyoxyethylene alkyl phenyl ether, a polyoxyethylene alkyl thioether, a polyoxyethylene sorbitan fatty acid monoester, a polyoxyethylene alkyl amide, and a polyglycerin ester. Preferable among them are polyethylene glycol, an ethylene oxide/propylene oxide copolymer, a polyoxyethylene alkyl ether, a polyoxyethylene alkyl phenyl ether and a polyoxyethylene sorbitan fatty acid monoester, among which an ethylene oxide/propylene oxide copolymer is particularly preferable from the viewpoint of excellent emulsion dispersibility and heat resistance.

The ethylene oxide/propylene oxide copolymer is a compound represented by the following general formula (4):

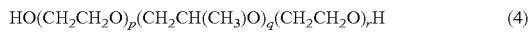

$$HO(CH_2CH_2O)_p(CH_2CH(CH_3)O)_q(CH_2CH_2O)_rH \quad (4)$$

wherein p, q and r each represent the number of moles of the corresponding unit added per molecule and may be the same or different. Here, p is an integer of 2 to 300, q is an integer of 10 to 150, and r is an integer of 2 to 300.

The weight-average molecular weight of the ethylene oxide/propylene oxide copolymer, although not particularly restricted, is preferably 3,000 to 30,000, more preferably 6,000 to 25,000, particularly preferably 8,000 to 20,000. The content of ethylene oxide in the ethylene oxide/propylene oxide copolymer is not particularly limited, but is preferably 40 to 95% by weight, more preferably 45 to 90% by weight, particularly preferably 50 to 85% by weight.

The surfactant in the present invention may be a mixture of two or more surfactants. In this case, an anionic surfactant and a nonionic surfactant may be simultaneously used.

The amount of the surfactant used in the aqueous dispersion of polyamide rubber elastic body according to the present invention is preferably 1 to 20 parts by weight, more preferably 1 to 12 parts by weight, based on 100 parts by weight of the polyamide rubber elastic body. When the amount of the surfactant used is lower than 1 part by weight, a stable aqueous dispersion may not be obtained. On the other hand, when the amount of the surfactant is higher than 20 parts by weight, emulsification is facilitated so that a stable aqueous dispersion can be obtained, but in a molded article formed from the resulting aqueous dispersion of the polyamide rubber elastic body, there may be a possibility of deteriorations in various physical properties that can be expected from the polyamide rubber elastic body. Particularly, there is a possibility of bleeding of the surfactant on the surface of the molded article, or of deterioration in transparency that is a feature of a molded article made of a polyamide rubber elastic body.

As long as the object of the present invention is not hindered, the aqueous dispersion of polyamide rubber elastic body according to the present invention may as necessary contain polymeric dispersion stabilizers such as polyvinyl alcohol, hydroxyethyl cellulose, methyl cellulose, hydroxypropyl cellulose, polyacrylates, polyacrylic ester salts and sodium alginate. By using these polymeric dispersion stabilizers, emulsification is facilitated so that a more stable aqueous dispersion can be obtained.

In the aqueous dispersion of polyamide rubber elastic body according to the present invention, the average particle diameter of the polyamide rubber elastic body is preferably 0.1 to 5 μm. When the average particle diameter is smaller than 0.1 μm, the static stability of the aqueous dispersion is improved, but because of increased viscosity, handling, in particular, production of a molded article may be made difficult. On the other hand, when the average particle diameter is greater than 5 μm, the static stability and mechanical stability of the aqueous dispersion may be deteriorated. This average particle diameter is determined by a laser diffraction particle size analyzing method.

The aqueous dispersion of polyamide rubber elastic body according to the present invention can be produced by a method of emulsifying and dispersing a polyamide rubber elastic body in an aqueous medium in the presence of a surfactant. The aqueous dispersion can be produced for example by the following two methods:

Production Method 1

In this production method, first, an organic phase containing a polyamide rubber elastic body dissolved in an organic solvent is mixed with an aqueous phase containing a surfactant dissolved in an aqueous medium to prepare an emulsion. The organic solvent used in preparation of the organic phase is not particularly limited. Examples of the organic solvent include aromatic hydrocarbon solvents such as toluene, xylene, ethyl benzene and tetralin, alicyclic hydrocarbon solvents such as cyclohexane and decalin, aliphatic hydrocarbon solvents such as hexane and heptane, halogenated hydrocarbon solvents such as chloroform and 1,2-dichloroethane, and alcohol solvents such as methanol, ethanol, isopropyl alcohol and t-butanol. These organic solvents can be used as a mixture of two or more thereof.

As the organic solvent, a mixed solvent of an aromatic hydrocarbon solvent or an alicyclic hydrocarbon solvent and an alcohol solvent is preferably used, since the solubility of the polyamide rubber elastic body is good in such a mixed solvent. Although the mixing ratio of the alcohol solvent to the aromatic hydrocarbon solvent or the alicyclic hydrocarbon solvent in the mixed solvent is not particularly limited, the amount of the alcohol solvent is set in the range of preferably 25 to 100 parts by weight, more preferably 40 to 60 parts by weight, based on 100 parts by weight of the aromatic hydrocarbon solvent or the alicyclic hydrocarbon solvent.

The amount of the organic solvent used in preparation of the organic phase is not particularly limited, but it is preferable that the concentration of the polyamide rubber elastic body in the organic phase is to be set at 3 to 30% by weight. When the concentration of the polyamide rubber elastic body in the organic phase is higher than 30% by weight, there is the possibility that the polyamide rubber elastic body is hardly uniformly dissolved in the organic phase, so that the particle diameter of the polyamide rubber elastic body in the intended aqueous dispersion of polyamide rubber elastic body is increased. It is uneconomical when the concentration of the polyamide rubber elastic body is lower than 3% by weight, because any result corresponding to the amount of the organic solvent used cannot be obtained.

The organic phase can be prepared by adding the polyamide rubber elastic body to an organic solvent and dissolving it. The temperature at the time of preparation, although not particularly restricted, is preferably controlled usually to 100° C. or less.

The aqueous phase can be prepared by adding a surfactant to an aqueous medium and dissolving it. The amount of the surfactant added to the aqueous medium is not particularly limited, but it is preferable that the concentration of the surfactant in the aqueous medium is to be set at 0.1 to 50% by weight.

When the organic phase is mixed with the aqueous phase to prepare an emulsion, the mixing ratio of the organic phase to the aqueous phase should be set such that the ratio of the surfactant to the polyamide rubber elastic body is in the range defined above. Generally, the amount of the aqueous phase is set preferably in the range of 20 to 500 parts by weight, more preferably 25 to 200 parts by weight, based on 100 parts by weight of the organic phase. When the amount of the aqueous phase is lower than 20 parts by weight, there are cases where emulsification is infeasible or the viscosity of the resulting emulsion becomes too high. On the other hand, when the amount of the aqueous phase is higher than 500 parts by weight, such a manner tends to lack practicality due to low productivity of the intended emulsion while emulsification is feasible.

The method of mixing the organic phase with the aqueous phase to prepare an emulsion is not particularly limited. For example, it is possible to use a method of mixing the organic phase with the aqueous phase under stirring with an emulsion machine such as a homomixer or a colloid mill or a method of mixing the organic phase with the aqueous phase by dispersion with an ultrasonic disperser or the like, among which the former is usually preferable. Although the temperature in preparation of the emulsion is not particularly limited, it is preferable that the temperature is usually set in the range of 5 to 70° C.

To mix the organic phase with the aqueous phase by means of an emulsion machine, an ultrasonic disperser or the like, the number of revolutions of a stirrer, the stirring time and temperature are regulated appropriately such that the average particle diameter of the polyamide rubber elastic body comes to be in the range mentioned above. The average particle diameter of the polyamide rubber elastic body can be set in the above-mentioned range not only by regulating the number of revolutions of the stirrer, the stirring time and the like, but also by selection of a surfactant used or control of the amount of the surfactant.

Then, the organic solvent is distilled off from the emulsion prepared in the above step. The aqueous dispersion of polyamide rubber elastic body according to the present invention is thereby obtained. The organic solvent can be distilled off from the emulsion by a usual method of, for example, removing the organic solvent by heating the emulsion under reduced pressure. The resulting aqueous dispersion of polyamide rubber elastic body may be concentrated as necessary by operation such as concentration under heating, centrifugation or wet separation, whereby the concentration of the polyamide rubber elastic body can be regulated depending on intended use.

When a polymeric dispersion stabilizer-containing aqueous dispersion of the polyamide rubber elastic body is prepared, the manner of adding the polymeric dispersion stabilizer is not particularly limited. For example, the polymeric dispersion stabilizer may be added during preparation of the aqueous phase by adding a surfactant to an aqueous median or may be added to the aqueous dispersion obtained by distilling an organic solvent off.

Production Method 2

In this production method, first, a polyamide rubber elastic body, a surfactant and an aqueous medium are introduced into a container to prepare a mixture thereof. The ratio of the surfactant to the polyamide rubber elastic body is set as described above. The amount of the aqueous medium used, although not particularly limited, is set preferably in the range of 40 to 1,000 parts by weight, more preferably 50 to 1.50 parts by weight, based on 100 parts by weight of the polyamide rubber elastic body. When the amount of the aqueous medium used is lower than 40 parts by weight, an aqueous dispersion excellent in dispersion stability and the like may not be obtained. When the amount of the aqueous medium used is higher than 1,000 parts by weight, an aqueous dispersion excellent in dispersion stability and the like can be obtained, but such a manner tends to lack practicality due to low productivity of the intended aqueous dispersion.

The container used in preparation of the mixture described above is preferably a pressure-resistant container provided with a heating means for heating the mixture at a temperature not lower than the temperature at which the polyamide rubber elastic body is softened in the aqueous medium and with a stirring means capable of giving shear strength to the content. For example, a pressure-resistant autoclave provided with a stirrer, or the like is preferably used.

Next, the mixture is heated with stirring to a temperature not lower than the softening temperature of the polyamide rubber elastic body, thereby emulsifying the mixture. Then, the emulsion thus obtained is cooled to room temperature, to yield the intended aqueous dispersion of the polyamide rubber elastic body. In this method, the number of revolutions of the stirrer, the stirring time and temperature are regulated appropriately such that the average particle diameter of the polyamide rubber elastic body comes to be in the range mentioned above. The average particle diameter of the polyamide rubber elastic body can be set in the above-mentioned range not only by regulating the number of revolutions of the stirrer the stirring time and the like, but also by selection of a surfactant used or control of the amount of the surfactant.

When a polymeric dispersion stabilizer-containing aqueous dispersion of polyamide rubber elastic body is prepared, the manner of adding the polymeric dispersion stabilizer is not particularly limited. For example, the polymeric dispersion stabilizer may be added during preparation of the mixture of a polyamide rubber elastic body, a surfactant and an aqueous medium, or may be added to the emulsion cooled to room temperature.

The aqueous dispersion of polyamide rubber elastic body according to the present invention has excellent static stability and moldability and is thus useful as a material for producing various molded articles. For example, the aqueous dispersion of polyamide rubber elastic body according to the present invention, when applied onto a base material or cast in a molding box and dried (that is, water is removed), is formed into molded articles of various forms such as coating, film and sheet, containing the surfactant and the polyamide rubber elastic body. The drying temperature is not particularly limited, but is usually preferably set in the range of 40 to 200° C.

In the aqueous dispersion of polyamide rubber elastic body according to the present invention, the polyamide rubber elastic body is excellent in compatibility with the surfactant. Therefore, the molded article obtained as described above is substantially free from bleeding of the surfactant, is superior in outward appearance with extremely excellent transparency, and is free from deteriorations in various properties inherent in the polyamide rubber elastic body, that is, flexibility, impact strength, tensile strength, vibration resistance, abrasion resistance, weather resistance, gas barrier properties, chemical resistance and heat resistance.

Accordingly, the aqueous dispersion of polyamide rubber elastic body according to the present invention can be utilized in various applications as a material for producing packaging films, automobile parts, sport-related products and medical devices; a coating agent for nylon fibers and polyester fibers used in clothing materials, carpets and air-bags; a coating agent and a gas barrier agent for paper and film; a raw material for foam rubber; a binder for fiber materials such as synthetic fibers, natural fibers and glass fibers; and a material for producing hoses, tubes, belts, gaskets and packing.

EXAMPLES

Example 1

A 500-ml separable flask was charged with 16 g of a polyether ester block amide copolymer (trade name: Pebax 2533SA01, melting point 134° C., manufactured by Arkema, Ltd.), 123 g of toluene and 61 g of isopropyl alcohol, and the copolymer was dissolved at 80° C. under stirring for 4 hours.

To the resulting organic phase solution was added an aqueous solution prepared by dissolving 5.3 g of sodium polyoxyalkylene lauryl ether sulfate (trade name: Trax ET-314, 30 wt % active ingredient, manufactured by NOF Corporation) in 100 g of water. The resulting mixture was stirred and mixed for 2 minutes by means of a homomixer (trade name: TK Homomixer Type M, manufactured by Tokushu Kika Kogy Co., Ltd.) to give an emulsion. The number of revolutions and temperature during stirring and mixing were set at 12,000 rpm and 40° C., respectively. The resulting emulsion was heated to 40 to 70° C. at a reduced pressure of 40 to 90 kPa thereby distilling off toluene and isopropyl alcohol, to yield an aqueous dispersion of polyamide rubber elastic body.

Example 2

An aqueous dispersion of polyamide rubber elastic body was obtained in the same manner as in Example 1 except that an aqueous solution prepared by dissolving 4.3 g of sodium polyoxyalkylene lauryl ether sulfate (trade name: Trax ET-314, 30 wt % active ingredient, manufactured by NOF Corporation) and 0.3 g of polyvinyl alcohol (trade name: Gosenol GH-20, manufactured by Nippon Synthetic Chemical Industry Co., Ltd.) in 100 g of water was added to the organic phase solution.

Example 3

An aqueous dispersion of polyamide rubber elastic body was obtained in the same manner as in Example 1 except that 2.0 g of sodium dioctylsulfosuccinate (trade name: Rapisol A-80, 80 wt % active ingredient, manufactured by NOF Corporation) was used in place of 5.3 g of sodium polyoxyalkylene lauryl ether sulfate (trade name: Trax ET-314, 30 wt % active ingredient, manufactured by NOF Corporation).

Example 4

An aqueous dispersion of polyamide rubber elastic body was obtained in the same manner as in Example 1 except that an aqueous solution prepared by dissolving 1.6 g of potassium oleate in 150 g of water was used in place of the aqueous solution prepared by dissolving 5.3 g of sodium polyoxyalkylene lauryl ether sulfate (trade name: Trax ET-314, 30 wt % active ingredient, manufactured by NOF Corporation) in 100 g of water.

Example 5

A 1-liter pressure-resistant autoclave provided with a turbine type stirring blade of 50 mm in diameter was charged with 160 g of a polyether block amide copolymer (trade name: UBESTA XPA9044X2, melting point 150° C., manufactured by Ube Industries, Ltd.), 224 g of deionized water, and 16 g of an ethylene oxide/propylene oxide copolymer (trade name: Pluronic F108, weight-average molecular weight of 15,500, ethylene oxide content of 80% by weight, manufactured by Asahi Denka Kogyo K.K.), and then closed. Then, the stirrer was started up to stir the mixture at a revolution number of 500 rpm, while the temperature in the autoclave was increased to 180° C. While the internal temperature was kept at 180° C., the mixture was stirred for another 15 minutes and then cooled to room temperature, to give an aqueous dispersion of polyamide rubber elastic body.

Comparative Example 1

An aqueous dispersion of polyamide rubber elastic body was obtained in the same manner as in Example 1 except that sodium polyoxyalkylene lauryl ether sulfate (trade name: Trax ET-314, 30 wt % active ingredient, manufactured by NOF Corporation) was used in an amount of 16 g.

Comparative Example 2

When the same procedure was carried out as in Example 1 except that sodium polyoxyalkylene lauryl ether sulfate (trade name: Trax ET-314, 30 wt % active ingredient, manufactured by NOF Corporation) was used in an amount of 0.3 g, massive solids were formed while toluene and isopropyl alcohol were distilled off, and an aqueous dispersion of polyamide rubber elastic body could not be obtained.

Evaluation

The aqueous dispersions obtained in Examples 1 to 5 and Comparative Example 1 were measured for their average particle diameter, and molded articles obtained from these aqueous dispersions were evaluated for their transparency and surfactant bleeding. The measurement method and evaluation method in each item are as follows. The results are shown in Table 1.

(Average Particle Diameter)

A laser diffraction particle size analyzer (trade name: SALD-2000J, manufactured by Shimadzu Corporation) was used in measurement.

(Transparency)

Each aqueous dispersion was applied by the use of a bar coater onto a polyester sheet so that a coating thereof reaches 30 μm in thickness after drying, and then dried at 170° C. for 1 hour. The state of a molded article thus obtained in the form of a coating was evaluated under the following criteria by visual observation.

○: The coating is transparent.
x: The coating is clouded.

(Bleeding)

Each coating obtained in the evaluation of transparency was evaluated for its surfactant bleeding under the following criteria by visual observation.

○: There is no bleeding of the surfactant from the surface of the coating.
x: There is slight bleeding of the surfactant from the surface of the coating.

TABLE 1

|  |  | Average particle diameter (μm) | Transparency | Bleeding |
|---|---|---|---|---|
| Examples | 1 | 0.7 | ○ | ○ |
|  | 2 | 0.5 | ○ | ○ |
|  | 3 | 0.7 | ○ | ○ |
|  | 4 | 1.2 | ○ | ○ |
|  | 5 | 1.9 | ○ | ○ |
| Comparative Examples | 1 | 0.6 | ○ | x |
|  | 2 | — | — | — |

From Table 1, it can be seen that the aqueous dispersions of polyamide rubber elastic bodies obtained in Examples 1 to 5 have a small average particle diameter, and the molded articles obtained therefrom are excellent in transparency and free from surfactant bleeding. On the other hand, the aqueous dispersion of polyamide rubber elastic body obtained in Comparative Example 1 had a small average particle diameter, but the molded article obtained therefrom was recognized to generate surfactant bleeding although having transparency.

The present invention can be carried out in other various forms without departure from the spirit and scope of the present invention. Accordingly, the embodiments and examples described above are merely illustrative in any aspects and are not to be construed as restrictive. The scope of the present invention is defined by the claims and is not restricted in any sense by the description of the specification. Any variations and modifications that fall within equivalence of the claims are intended to fall within the scope of the present invention.

The invention claimed is:

1. A method of producing an aqueous dispersion of polyamide rubber elastic body, consisting of the steps of:
   introducing a polyamide rubber elastic body, a surfactant and an aqueous medium into a container provided with a stirrer,
   after the step of introducing the polyamide rubber elastic body, the surfactant and the aqueous medium into the container, starting up the stirrer to stir the mixture in the container while the temperature in the container is increased to not lower than the softening temperature of the polyamide rubber elastic body to emulsify the mixture, and
   cooling the resulting emulsion to room temperature,
   wherein the polyamide rubber elastic body has a structure in which a rigid polymer system having a crystalline polyamide block with a high melting point is combined with a soft polymer system having a noncrystalline polyether block with a low glass transition temperature, and the surfactant is used in an amount of 1 to 20 parts by weight based on 100 parts by weight of the polyamide rubber elastic body, and
   the surfactant is a nonionic surfactant or a mixture of an anionic surfactant and a nonionic surfactant.

2. The method of producing an aqueous dispersion of polyamide rubber elastic body according to claim 1, wherein the polyamide rubber elastic body is a polyether block amide copolymer or a polyether ester block amide copolymer.

3. The method of producing an aqueous dispersion of polyamide rubber elastic body according to claim 1, wherein the surfactant is an ethylene oxide/propylene oxide copolymer.

4. A method of producing an aqueous dispersion of polyamide rubber elastic body, consisting of the steps of:
   introducing a polyamide rubber elastic body, a surfactant and an aqueous medium into a container provided with a stirrer;
   after the step of introducing the polyamide rubber elastic body, the surfactant and the aqueous medium into the container, starting up the stirrer to stir the mixture in the container while the temperature in the container is increased to not lower than the softening temperature of the polyamide rubber elastic body to emulsify the mixture;
   cooling the resulting emulsion to room temperature; and
   adding a polymeric dispersion stabilizer to the resulting emulsion cooled to room temperature,
   wherein the polyamide rubber elastic body has a structure in which a rigid polymer system having a crystalline polyamide block with a high melting point is combined with a soft polymer system having a noncrystalline polyether block with a low glass transition temperature, and the surfactant is used in an amount of 1 to 20 parts by weight based on 100 parts by weight of the polyamide rubber elastic body, and
   the surfactant is a nonionic surfactant or a mixture of an anionic surfactant and a nonionic surfactant.

5. A method of producing an aqueous dispersion of polyamide rubber elastic body, consisting of the steps of:
   introducing a polyamide rubber elastic body, a surfactant, a polymeric dispersion stabilizer and an aqueous medium into a container provided with a stirrer,
   after the step of introducing the polyamide rubber elastic body, the surfactant, the polymeric dispersion stabilizer and the aqueous medium into the container, starting up the stirrer to stir the mixture in the container while the temperature in the container is increased to not lower than the softening temperature of the polyamide rubber elastic body to emulsify the mixture, and
   cooling the resulting emulsion to room temperature,
   wherein the polyamide rubber elastic body has a structure in which a rigid polymer system having a crystalline polyamide block with a high melting point is combined with a soft polymer system having a noncrystalline polyether block with a low glass transition temperature, and the surfactant is used in an amount of 1 to 20 pans by weight based on 100 parts by weight of the polyamide rubber elastic body, and
   the surfactant is a nonionic surfactant or a mixture of an anionic surfactant and a nonionic surfactant.

* * * * *